United States Patent
Brannan et al.

(10) Patent No.: US 11,900,330 B1
(45) Date of Patent: Feb. 13, 2024

(54) VEHICLE TELEMATICS SYSTEMS AND METHODS

(71) Applicant: State Farm Mutual Automobile Insurance Company, Bloomington, IL (US)

(72) Inventors: Joseph Robert Brannan, Bloomington, IL (US); Ryan Michael Gross, Normal, IL (US); Matthew Eric Riley, Sr., Heyworth, IL (US); Darwin Gene Beachy, Hopedale, IL (US); Michael Aaron Myers, Heyworth, IL (US); Brian N. Harvey, Bloomington, IL (US); Benjamin Joel Tucker, Bloomington, IL (US); Scott Thomas Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/071,163

(22) Filed: Oct. 15, 2020

Related U.S. Application Data

(60) Provisional application No. 62/938,423, filed on Nov. 21, 2019, provisional application No. 62/925,500, (Continued)

(51) Int. Cl.
    *G06Q 10/20* (2023.01)
    *G07C 5/00* (2006.01)

(52) U.S. Cl.
    CPC ............. *G06Q 10/20* (2013.01); *G07C 5/006* (2013.01)

(58) Field of Classification Search
    None
    See application file for complete search history.

(56) References Cited

U.S. PATENT DOCUMENTS

| | | | |
|---|---|---|---|
| 6,434,512 B1 * | 8/2002 | Discenzo | F16C 19/52 702/184 |
| 7,822,675 B1 * | 10/2010 | Kuno | G06Q 40/06 705/37 |

(Continued)

FOREIGN PATENT DOCUMENTS

| | | |
|---|---|---|
| CN | 109993563 A | 7/2019 |
| CN | 111260202 A | 6/2020 |

(Continued)

OTHER PUBLICATIONS

Selcuk S. "Predictive maintenance, its implementation and latest trends". Proceedings of the Institution of Mechanical Engineers, Part B: Journal of Engineering Manufacture. 2017;231(9):1670-1679. doi:10.1177/0954405415601640 (Year: 2017).*

(Continued)

*Primary Examiner* — Paul R Fisher
(74) *Attorney, Agent, or Firm* — Armstrong Teasdale LLP

(57) ABSTRACT

Described herein are methods and systems for generating and applying vehicle maintenance models to vehicle telematics data. A vehicle telematics analytics (VTA) computing device is configured to receive vehicle telematics data associated with operation of a subject vehicle, and apply the received vehicle telematics data to a vehicle maintenance model to determine whether the operation of the subject vehicle is better or worse than standard operation of like vehicles. The VTA computing device may adjust a maintenance cost and/or determine if a user of the vehicle is eligible for a reward based upon this determination. The VTA computing device is configured to transmit an itemized report to the user including the adjusted maintenance cost and/or the reward as well as one or more other vehicle costs.

20 Claims, 7 Drawing Sheets

Related U.S. Application Data filed on Oct. 24, 2019, provisional application No. 62/923,050, filed on Oct. 18, 2019.

(56) References Cited

U.S. PATENT DOCUMENTS

| | | | |
|---|---|---|---|
| 8,073,653 B2* | 12/2011 | Suzuki | G07C 3/00 702/181 |
| 9,311,271 B2 | 4/2016 | Wright | |
| 9,522,641 B1* | 12/2016 | Cermak | H04W 4/046 |
| 9,633,487 B2 | 4/2017 | Wright | |
| 10,192,369 B2 | 1/2019 | Wright | |
| 10,198,879 B2 | 2/2019 | Wright | |
| 10,229,461 B2 | 3/2019 | Akiva et al. | |
| 10,332,208 B1 | 6/2019 | Loo et al. | |
| 10,366,370 B1 | 7/2019 | Binion et al. | |
| 10,668,930 B1 | 6/2020 | Harvey et al. | |
| 10,759,442 B2 | 9/2020 | Stenneth et al. | |
| 10,817,891 B1 | 10/2020 | Hakimi-Boushehri et al. | |
| 10,832,261 B1 | 11/2020 | Chan et al. | |
| 2004/0243423 A1 | 12/2004 | Rix et al. | |
| 2007/0271014 A1* | 11/2007 | Breed | B60R 21/0152 701/31.9 |
| 2008/0306799 A1* | 12/2008 | Sopko, III | G06Q 10/0631 705/7.12 |
| 2009/0037206 A1* | 2/2009 | Byrne | G06Q 10/06 705/305 |
| 2010/0094688 A1* | 4/2010 | Olsen, III | G06Q 10/08 705/7.42 |
| 2011/0270706 A1 | 11/2011 | Anspach et al. | |
| 2013/0244210 A1* | 9/2013 | Nath | G09B 19/167 434/65 |
| 2013/0311249 A1* | 11/2013 | Solomon | G06Q 30/0207 705/14.1 |
| 2014/0039990 A1 | 2/2014 | Georgi | |
| 2014/0074345 A1* | 3/2014 | Gabay | G07C 5/08 701/31.4 |
| 2014/0136309 A1 | 5/2014 | Goldman et al. | |
| 2014/0191858 A1 | 7/2014 | Morgan et al. | |
| 2014/0309849 A1 | 10/2014 | Ricci | |
| 2014/0350989 A1* | 11/2014 | Telatar | G06Q 10/1097 705/7.21 |
| 2015/0019067 A1* | 1/2015 | Chakravarty | B60W 40/09 701/31.5 |
| 2015/0091507 A1* | 4/2015 | Hyde | B60L 53/37 320/108 |
| 2015/0100505 A1 | 4/2015 | Binion et al. | |
| 2015/0213420 A1 | 7/2015 | Krishnamurthy et al. | |
| 2015/0246654 A1 | 9/2015 | Tadic et al. | |
| 2015/0348058 A1* | 12/2015 | Liu | G06Q 30/0201 705/14.49 |
| 2016/0035150 A1* | 2/2016 | Barfield, Jr. | G05B 23/0254 701/29.3 |
| 2016/0163130 A1 | 6/2016 | Zagajac et al. | |
| 2017/0109712 A1* | 4/2017 | Bullock | H04L 67/26 |
| 2017/0140652 A1 | 5/2017 | Hodges et al. | |
| 2018/0082342 A1 | 3/2018 | Cahan et al. | |
| 2018/0096433 A1* | 4/2018 | Belz | H04N 7/183 |
| 2018/0108189 A1* | 4/2018 | Park | G07C 5/008 |
| 2018/0268621 A1* | 9/2018 | Oz | G06Q 30/0278 |
| 2019/0171187 A1* | 6/2019 | Cella | G06N 20/00 |
| 2020/0005399 A1 | 1/2020 | Takamatsu et al. | |
| 2020/0074492 A1 | 3/2020 | Scholl et al. | |
| 2020/0152067 A1 | 5/2020 | Salles et al. | |
| 2021/0334865 A1 | 10/2021 | Irey | |

FOREIGN PATENT DOCUMENTS

| | | | | |
|---|---|---|---|---|
| EP | 2680534 A1 * | 6/2012 | | H04L 28/08 |
| JP | 2018180643 A | 11/2018 | | |
| KR | 2017116487 A | 10/2017 | | |
| WO | WO0167335 A1 * | 9/2001 | | G06F 17/60 |
| WO | WO2008140381 A1 * | 11/2008 | | G07C 5/08 |
| WO | WO2013141797 A2 * | 9/2013 | | G06Q 10/04 |
| WO | 2015181583 A1 | 12/2015 | | |
| WO | 2016126421 A1 | 8/2016 | | |
| WO | 2017142536 A1 | 8/2017 | | |
| WO | 2018077644 A1 | 5/2018 | | |
| WO | 2019140018 A1 | 7/2019 | | |

OTHER PUBLICATIONS

Gopalakrishna Palem, "Condition-based Maintenance using sensor arrays and telematics" International Journal of Mobile Network Communications & Telematics, vol. 3, No. 3, Jun. 2013. (Year: 2013).*

Jean Pilon-Bignell, Angie Milne, "Geotab management by measurement Increasing Profitability with telematics", Geotab Inc. https://www.connectedvehicles.com/wp-content/uploads/2016/07/increasing-profitability-whitepaper.pdf 2016 (Year: 2016).*

Bobby D. Gerardo, Jaewan Lee, "A framework for discovering relevant patterns using aggregation and intelligent data mining agents in telematics systems", Telematics and Informatics, vol. 26, Issue 4, 2009, pp. 343-352, ISSN 0736-5853. (Year: 2009).*

J. Siegel, R. Bhattacharyya, A. Deshpande and S. Sarma, "Vehicular engine oil service life characterization using On-Board Diagnostic (OBD) sensor data," Sensors, 2014 IEEE, 2014, pp. 1722-1725, doi: 10.1109/ICSENS.2014.6985355. (Year: 2014).*

J. Wahlström, I. Skog and P. Händel, "Smartphone-Based Vehicle Telematics: A Ten-Year Anniversary," in IEEE Transactions on Intelligent Transportation Systems, vol. 18, No. 10, pp. 2802-2825, Oct. 2017, doi: 10.1109/TITS.2017.2680468 (Year: 2017).*

Peng Wu, Which battery-charging technology and insurance contract is preferred in the electric vehicle sharing business?, Transportation Research Part A: Policy and Practice, vol. 124, 2019, pp. 537-548, ISSN 0965-8564, https://doi.org/10.1016/j.tra.2018.04.010 (Year: 2019).*

* cited by examiner

VEHICLE TELEMATICS SYSTEMS AND METHODS

CROSS-REFERENCE TO RELATED APPLICATIONS

This application claims the benefit of priority to U.S. Provisional Patent Application No. 62/923,050, filed on Oct. 18, 2019, entitled "VEHICLE TELEMATICS SYSTEMS AND METHODS," to U.S. Provisional Patent Application No. 62/925,500, filed on Oct. 24, 2019, entitled "VEHICLE TELEMATICS SYSTEMS AND METHODS," and to U.S. Provisional Patent Application No. 62/938,423, filed on Nov. 21, 2019, entitled "VEHICLE TELEMATICS SYSTEMS AND METHODS," the entire contents and disclosures of which are hereby incorporated by reference herein in their entirety.

FIELD OF THE INVENTION

The present disclosure relates to systems and methods for generating vehicle maintenance models based upon vehicle telematics data from a vehicle and applying those models to determine a usage-based vehicle maintenance cost. More particularly, the present disclosure relates to systems and methods for using telematics-based maintenance models to determine how a driver's driving behavior affects maintenance of their vehicle, and adjusting vehicle maintenance costs based thereon.

BACKGROUND

Modern automobiles may be equipped with electronic devices that are capable of generating vehicle telematics data. For example, vehicle telematics data may be collected by vehicle mounted navigation systems (e.g., GPS receivers), integrated hands-free mobile communications systems, and the like. Conventional practical applications of vehicle telematics data may relate to providing auto insurance discounts for risk averse drivers.

Conventionally, for vehicle maintenance, a user (e.g., a vehicle owner/operator) may depend upon a predetermined maintenance schedule (such as a maintenance schedule printed in a vehicle owner's manual) for scheduling maintenance activities. In other cases, a user may be alerted to a maintenance requirement in a vehicle by observable degradation and/or failure of a particular component. Similarly, in many instances, such as, for example, in the case of a vehicle's tires, a user may visually inspect a vehicle component to determine whether, and when, the component may require maintenance and/or replacement.

In addition to the drawbacks associated with maintenance managed by, and initiated at the discretion of, a user, the approaches to vehicle maintenance described above may not adequately prepare a user for the cost of repairing or replacing a worn or damage vehicle component. Specifically, many vehicle components (e.g., tires) may cost hundreds of dollars to replace. Many users may encounter such costs unexpectedly, but even if a maintenance cost is anticipated, it is not uncommon that the expense is a financial hardship. Conventional techniques may include additional drawbacks as well.

At least some vehicle manufacturers have contemplated maintenance plans associated with their vehicles. A user may opt-in to a vehicle maintenance plan and pay a periodic maintenance cost (e.g., monthly, bi-monthly, semi-yearly, yearly, etc.). These maintenance plans may be "one size fits all." For example, these plans may be priced to cover standard or expected maintenance for the vehicle, or may be priced to cover "worse-case" scenarios above and beyond normal vehicle wear and tear. That is, these maintenance plans may not be tailored to how each user actually uses their vehicle. As such, some users may pay significantly more into a maintenance plan than they would actually spend on such maintenance.

BRIEF SUMMARY

The present embodiments relate to systems and methods for automatically generating vehicle maintenance models based upon vehicle telematics data from a vehicle and applying those models to determine a usage-based vehicle maintenance cost. The present embodiments may also determine an adjustment to a standard vehicle maintenance plan based upon the vehicle telematics data. The present embodiments may enable maintenance plan providers (e.g., vehicle manufacturers or other entities) to adjust known vehicle maintenance plans to suit users' actual or expected driving needs and/or behavior.

In one aspect, a vehicle telematics analytics (VTA) computing device may be provided. The VTA computing device may include a memory and a processor in communication with the memory. The processor may be programmed to: (i) receive vehicle telematics data associated with operation of a subject vehicle, (ii) apply the received vehicle telematics data to a vehicle maintenance model to determine whether the operation of the subject vehicle is better or worse than standard operation of like vehicles, (iii) identify a maintenance cost associated with the subject vehicle, (iv) adjust the maintenance cost to determine an adjusted maintenance cost associated with the subject vehicle based upon whether the operation of the subject vehicle is better or worse than standard operation of the like vehicles, and/or (v) transmit the adjusted maintenance cost to a user associated with the subject vehicle in an itemized report including one or more other vehicle costs. The VTA computing device may have additional, less, and/or alternative functionality, including that described herein.

In another aspect, a computer-implemented method for using vehicle telematics data to determine a usage-based vehicle maintenance cost may be provided. The method may be implemented by one or more processors and/or associated transceivers. The method may include (1) receiving, by the one or more processors and/or associated transceivers, vehicle telematics data associated with operation of a subject vehicle, such as via wireless communication or data transmission collect by and/or transmitted from the subject vehicle or a user mobile device over one or more radio frequency links; (2) applying, by the one or more processors, the received vehicle telematics data to a vehicle maintenance model to determine whether the operation of the subject vehicle is better or worse than standard operation of like vehicles; (3) identifying, by the one or more processors, a maintenance cost associated with the subject vehicle; (4) adjusting, by the one or more processors, the maintenance cost to determine an adjusted maintenance cost associated with the subject vehicle based upon whether the operation of the subject vehicle is better or worse than standard operation of the like vehicles; and/or (5) transmitting, by the one or more processors and/or associated transceivers, the adjusted maintenance cost to a user associated with the subject vehicle in an itemized report including one or more other vehicle costs. The method may include additional, less, or alternate functionality, including that discussed elsewhere.

In a further aspect, a non-transitory computer-readable storage media having computer-executable instructions embodied thereon may be provided. When executed by a vehicle telematics data (VTA) computing device having at least one processor in communication with at least one memory, the computer-executable instructions may cause the at least one processor to: (i) receive vehicle telematics data associated with operation of a subject vehicle; (ii) apply the received vehicle telematics data to a vehicle maintenance model to determine whether the operation of the subject vehicle is better or worse than standard operation of like vehicles; (iii) identify a maintenance cost associated with the subject vehicle; (iv) adjust the maintenance cost to determine an adjusted maintenance cost associated with the subject vehicle based upon whether the operation of the subject vehicle is better or worse than standard operation of the like vehicles; and/or (v) transmit the adjusted maintenance cost to a user associated with the subject vehicle in an itemized report including one or more other vehicle costs. The computer-executable instructions may cause the at least one processor to perform additional, less, or alternative functionality, including that discussed elsewhere herein.

In another aspect, a vehicle telematics analytics (VTA) computing device may be provided. The VTA computing device may include a memory and a processor in communication with the memory. The processor may be programmed to: (i) receive vehicle telematics data associated with operation of a subject vehicle, (ii) apply the received vehicle telematics data to a vehicle maintenance model to determine whether the operation of the subject vehicle is better or worse than standard operation of like vehicles, (iii) when the operation of the subject vehicle is better than standard operation of the like vehicles, identify one or more rewards for which a user of the subject vehicle is eligible, and/or (iv) transmit an identification of the one or more rewards to the user in an itemized report including a vehicle maintenance cost and one or more other vehicle costs. The VTA computing device may have additional, less, and/or alternative functionality, including that described herein.

In another aspect, a computer-implemented method for using vehicle telematics data to determine a usage-based vehicle maintenance cost may be provided. The method may include being implemented by one or more processors and/or associated transceivers. The method may include (1) receiving, via the one or more processors and/or associated transceivers, vehicle telematics data associated with operation of a subject vehicle, such as receiving via wireless communication or data transmission vehicle telematics data generated by and transmitted from the subject vehicle or a customer mobile device over one or more radio frequency links; (2) applying, via the one or more processors, the received vehicle telematics data to a vehicle maintenance model to determine whether the operation of the subject vehicle is better or worse than standard operation of like vehicles; (3) when the operation of the subject vehicle is better than standard operation of the like vehicles, identifying, via the one or more processors, one or more rewards for which a user of the subject vehicle is eligible; and/or (4) transmitting, via the one or more processors and/or associated transceivers, an identification of the one or more rewards to the user in an itemized report including a vehicle maintenance cost and one or more other vehicle costs. The reward may include one or more of a vehicle charging credit, a merchandise credit, and a warranty extension. The method may include additional, less, or alternate functionality, including that discussed elsewhere herein.

In yet another aspect, a non-transitory computer-readable storage media having computer-executable instructions embodied thereon may be provided. When executed by a vehicle telematics data (VTA) computing device having at least one processor in communication with at least one memory, the computer-executable instructions may cause the at least one processor to: (i) receive vehicle telematics data associated with operation of a subject vehicle; (ii) apply the received vehicle telematics data to a vehicle maintenance model to determine whether the operation of the subject vehicle is better or worse than standard operation of like vehicles; (iii) when the operation of the subject vehicle is better than standard operation of the like vehicles, identify one or more rewards for which a user of the subject vehicle is eligible; and/or (iv) transmit an identification of the one or more rewards to the user in an itemized report including a vehicle maintenance cost and one or more other vehicle costs. The computer-executable instructions may cause the at least one processor to perform additional, less, or alternative functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
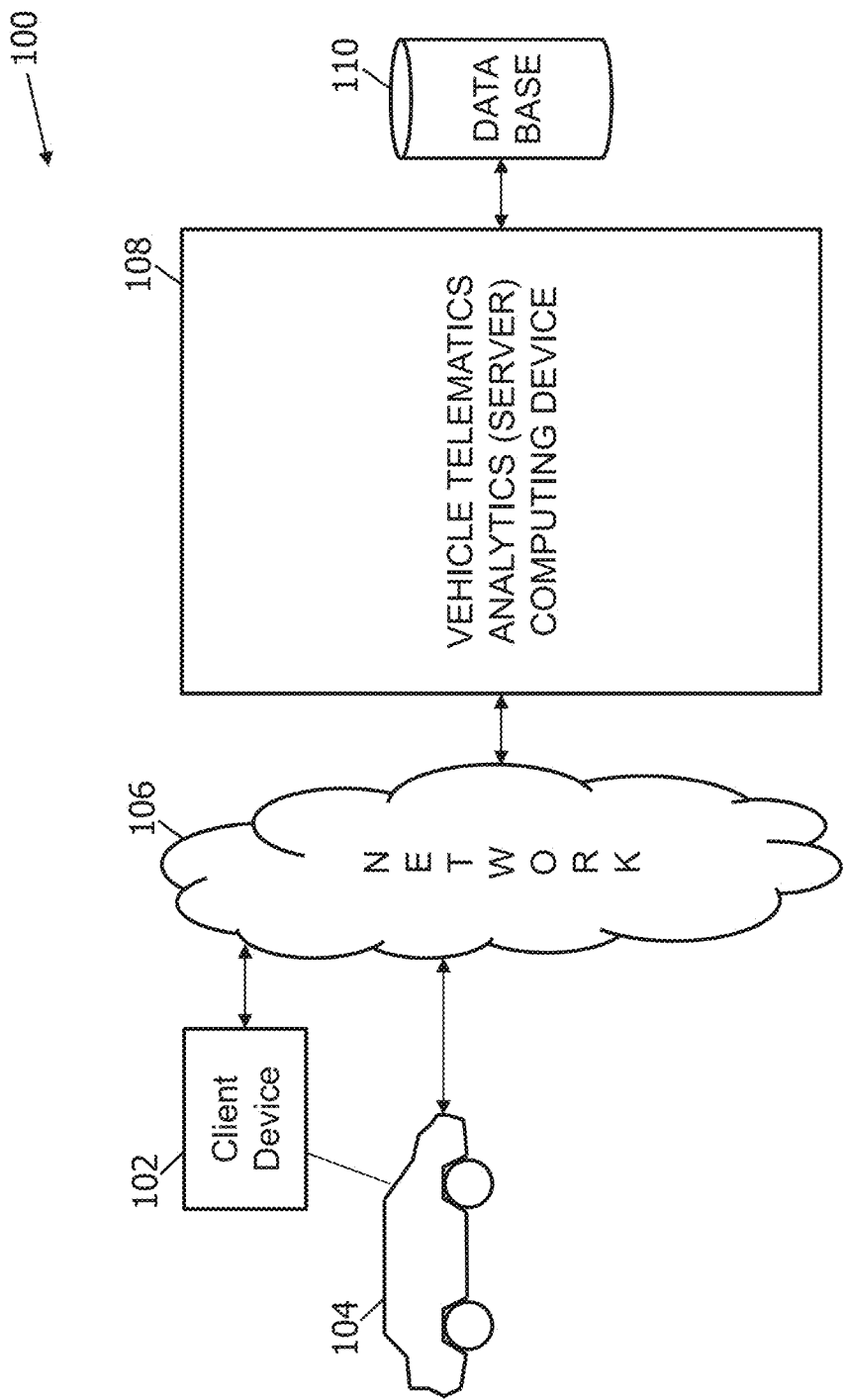
FIG. 1 illustrates a schematic diagram of an exemplary computer system for generating vehicle maintenance models based upon vehicle telematics data from a vehicle and applying those models to determine a usage-based vehicle maintenance cost, in accordance with various embodiments of the present disclosure.

The Figures depict preferred embodiments for purposes of illustration only.

One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating vehicle maintenance models based upon vehicle telematics data from a vehicle and applying those models to determine a usage-based vehicle maintenance cost. In one exemplary embodiment, the process may be performed by at least one front-end system, such as a client device (e.g., a vehicle, vehicle computing device, and/or a user computing device), and at least one back-end system, such as a server computing device.

In at least some embodiments, a user may acquire (e.g., purchases, leases, etc.) a vehicle. A vehicle seller, manufacturer, lessor, or other entity associated with the vehicle may offer the user an "all-in-one" vehicle payment plan, which covers a plurality of costs associated with use (e.g., ownership, leasing, etc.) of the vehicle. For example, the vehicle payment plan may include costs associated with: (i) a price of the vehicle (e.g., a purchase price, lease cost, subscription fee, etc.); (ii) any applicable financing costs (e.g., an interest on a vehicle loan); (iii) maintenance costs; (iv) fuel costs (e.g., costs for gas, charging electricity, batteries, and/or any other fuel source); and/or insurance costs. In some such embodiments, the user may be able to select which one or more of the above costs they would like to cover with their vehicle payment plan.

In the exemplary embodiment, one or more of the above costs may be fixed (e.g., the price of the vehicle, insurance cost, etc.) and one or more of the above costs may be variable based upon operation of the vehicle (e.g., the maintenance cost, the charging cost). As used herein, operation of the vehicle includes the user's driving behavior, as well as operation of the vehicle by any other user (e.g., a spouse or partner, a child, a co-lessee, etc.).

In the exemplary embodiment, a standard maintenance and/or charging cost may be charged to a user within their overall vehicle pricing package. These costs are associated with typical, expected operation of the vehicle. According to the present disclosure, maintenance models associated with maintenance of a vehicle are generated based upon reference telematics data captured from a plurality of vehicles to determine this standard or typical expected operation of a "subject" vehicle.

Industry vehicle maintenance data may also be incorporated into these vehicle maintenance models, such as industry vehicle maintenance data provided by vehicle manufacturers, dealerships, service providers, and the like. Industry vehicle maintenance data may include vehicle and/or vehicle component life expectancy data, replacement cycle data, vehicle component cost data (e.g., repair costs, replacement costs), vehicle labor rates, and the like. As used herein, a "replacement cycle" may include a standard or expected time remaining until a vehicle component should be replaced or scheduled for maintenance. In certain embodiments, industry vehicle maintenance data may be retrieved from a database and/or specifically requested from an industry data source (e.g., for a particular make/model of vehicle).

The maintenance models reflect how often a vehicle may be serviced, which components require service, and the like. In some embodiments, the reference vehicle telematics data may be analyzed to determine a replacement cycle associated with one or more vehicle components, which may be included as part of the vehicle maintenance model.

Charging models may also be developed based upon the reference telematics data and/or reference charging data from a plurality of charging stations. Charging models may reflect typical or standard charging characteristics for electric vehicles, such as charging frequency, duration, location, and the like. It should be readily understood that "charging models" may encompass alternative fuel sources than electricity, including gasoline (e.g., how often a gas-powered and/or hybrid vehicle is re-fueled) and/or any other fuel source.

In addition, associated pricing models may also be generated based upon the vehicle maintenance and/or charging data. These pricing models reflect standard maintenance and/or charging costs that may be incurred over a period of time when a vehicle is operated in a standard, typical, or expected fashion. The pricing models may incorporate industry vehicle maintenance data including costs for maintenance, repair, and/or replacement of various vehicle components.

Vehicle maintenance models may be further used to predict what maintenance may be needed for a particular subject vehicle based upon how the subject vehicle is operated, as compared to a "standard" maintenance schedule. In particular, vehicle telematics data may be collected for the subject vehicle that reflects actual usage and operation of the subject vehicle. That usage may be compared to standard usage, to determine whether the subject vehicle is being operated "better" (e.g., more safely, with less expected wear and tear, and/or in a risk averse manner, etc.) than standard.

The pricing models may then be applied to determine whether a user's maintenance and/or charging cost should be adjusted (e.g., whether the user should pay a discounted maintenance cost, or, in some embodiments, pay an increased maintenance cost). In some embodiments, costs may not be adjusted, but a user may be offered a reward when the vehicle telematics data reflects operation of the subject vehicle that may result in less maintenance, such as a refund of some monies already paid, a charging credit, a merchandise credit, credits or gift cards towards third-party purchases or brands, and/or any other reward.

It should be readily understood that these maintenance and/or pricing models may be applicable in any vehicle ownership and/or usage situation, such as a standard vehicle purchase that incorporates maintenance and/or charging costs into a periodic payment. These models are also applicable to vehicle leasing situations, as well as vehicle subscription and/or shared-use situations. Additionally or alternatively, the pricing model may be incorporated into the vehicle maintenance and/or charging model.

In at least some embodiments, where operation of a subject vehicle is "better" (e.g., reflects safer driving, indicates less than average usage and/or wear and tear, indicates less maintenance and/or less frequent charging is expected, etc.), a user associated with the subject vehicle may be offered additional and/or alternative benefits. For example, a user may be offered an additional warranty and/or may earn extensions to an existing warranty associated with the subject vehicle.

Accordingly, in the exemplary embodiment, a computer system for generating vehicle maintenance models based upon vehicle telematics data may receive telematics data from a vehicle and apply those models to determine a usage-based vehicle maintenance cost. More particularly, the computer system may include a vehicle telematics analytics (VTA) computing device (e.g., a back-end server computing device) configured to receive vehicle telematics data associated with a vehicle (a "subject vehicle") from a client device, which may include one or more of the vehicle itself, a computing device integral to the vehicle, a user computing device (e.g., a mobile phone or mobile device), and/or an external or third-party computing device coupled to the vehicle (e.g., a beacon).

The VTA computing device may apply a maintenance model and/or a charging model to the received vehicle telematics data to determine how operation of the subject vehicle compares to standard and/or expected operation of a vehicle of the same or a similar type. In at least some embodiments, the vehicle maintenance and/or charging model(s) may output a score that indicates whether operation of the subject vehicle was better or worse than is standard. "Standard" operation may be defined as within a predefined range of an average, typical, expected, and/or preferred operation or driving behavior. Other "benchmark" operation may be defined as an expected or desired operation of a vehicle, relative to standard operation. Such benchmark operation may be used to define one or more thresholds for comparison. For example, certain benchmark thresholds of driving operation that are below standard operation may still be used to offer cost adjustments/rewards as described herein. Benchmark operation may also be defined as within a predefined range (other than the predefined "standard" range) of the average, typical, expected, and/or preferred operation or driving behavior. In certain embodiments, benchmark operation may not be worse than standard, but may refer to a shifted or modified predefined range of the average, typical, expected, and/or preferred operation or driving behavior (e.g., the range may be shifted up, shifted down, reduced, or widened to encompass other driving behavior).

In some embodiments, better operation is indicated by a positive score, whereas worse operation is indicated by a negative score. In such embodiments, standard operation may be indicated by a score of "zero." In other embodiments, scores may be defined in a range of one through ten, where a score of ten indicates the best or the worst operation, and a score of five indicates standard operation. In still other embodiments, the score may be qualitative rather than quantitative, such as an indication of "poor," "standard/fair," or "good."

The score (or any output from the vehicle maintenance/charging model(s)) may be input to a pricing model to determine whether a user associated with the subject vehicle is eligible for any cost adjustment and/or reward. In some cases, the VTA computing device may retrieve user preferences to determine whether the user has selected or defined their preference in how to receive a cost adjustment/reward (e.g., a user prefers a merchandise credit over a refund).

The VTA computing device may transmit a report to the user (e.g., to a client device of the user) associated with the subject vehicle. The report may include a total amount that will be or has been charged to the user, as well as a cost breakdown. That is, the report may also include an itemized list of each cost that contributed to the total amount, including the maintenance and/or charging cost(s), as well as an indicator of whether any cost has been adjusted based upon the received telematics data (e.g., based upon actual operation of the subject vehicle). The report may also include an indication of any reward or offer that the user has earned or is eligible to earn. The report may be generated and/or transmitted on-demand (e.g., upon request from the user) and/or periodically (e.g., every month, every two months, every six months, etc.).

As used herein, "user" refers to a party associated with a subject vehicle, such as owners, drivers, and/or passengers. For example, users may include an owner of a subject vehicle, a lessee of a subject vehicle, a driver of a subject vehicle, and the like. Any number of drivers may be associated with a single subject vehicle. In some cases, a user may refer to a primary user responsible for some or all of the payment(s) associated with a subject vehicle.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, commercial vehicles (e.g., trucking), industrial vehicles (e.g., construction vehicles), "riding" lawnmowers, planes, and/or any kind of land-, water-, or air-based vehicle.

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems may include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or over steering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane departure systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

As used herein, a "vehicle component" may be any component or part of a vehicle, such as, for example, and without limitation, one or more vehicle tires, a vehicle oil filter and/or a vehicle lubricant, such as vehicle motor oil, vehicle fluids, electronic vehicle components, autonomous vehicle systems, vehicle brake pads, transmission, clutch, drivetrain, sensors (such as smart vehicle sensors or autonomous vehicle sensors), and the like.

In addition, as used herein, "vehicle telematics data" is any data associated with operation of a vehicle including one or more vehicle components, such as acceleration, braking, cornering, speed, vehicle mileage, location (e.g., from a GPS system of the vehicle and/or a user computing device), a time of day of operation of the vehicle, a tread depth of one or more vehicle tires, an environmental sensor reading, vehicle oil and fluid levels, tire pressure, tire temperature, vehicle brake pad thicknesses, and the like. Additionally or alternatively, vehicle telematics data may include data captured by a vehicle component, such as environmental data (e.g., temperature, humidity) or contextual data (e.g., location, on-road vs. off-road driving).

In some embodiments, vehicle telematics data may be collected by one or more sensors mounted on or installed within a vehicle. Such sensors may be configured to monitor a vehicle component and may provide vehicle telematics data collected in conjunction with a particular vehicle component to the system. In certain embodiments, the sensors may be configured to monitor environmental factors, such as temperature, humidity, acceleration, and the like. Thus, the VTA computing device receives vehicle telematics data associated with at least one vehicle component and/or environmental factor.

According to the present disclosure, when a user has opted-in to a vehicle pricing package including maintenance and/or charging costs, vehicle telematics data may be collected during all operation of a subject vehicle, by one or more client devices, as described above. The vehicle telematics data may be transmitted to the VTA computing device to perform the above-described analyses after each trip taken using the subject vehicle and/or on a periodic basis (e.g., at a specific time each day, each week, each month, etc.).

In the exemplary embodiment, vehicle telematics data may be received and analyzed to determine how a subject vehicle is being operated. For example, vehicle telematics data associated with a subject vehicle's acceleration may be received and input to a vehicle maintenance and/or charging model, as described above. Such vehicle telematics data may be generated by and/or received from engine sensors, fuel sensors, gas pedal sensors, accelerometers, and the like.

Heavy or extreme acceleration may increase the wear and tear on certain vehicle components and/or use more battery life than standard acceleration, such that the subject vehicle may require more frequent charging. More frequent charging may in turn put an increased strain on charging components of the subject vehicle. Accordingly, the vehicle maintenance and/or charging model may output a score (or other output) that indicates a subject vehicle operated with heavy acceleration is "worse" than standard (and/or other selected benchmark operation) with respect to maintenance/charging.

In some embodiments, a maintenance and/or charging cost associated with the subject vehicle may be increased. On the other hand, slow or light acceleration may have the opposite effect—reduced charging frequency, reduced strain on the charging infrastructure, etc. Accordingly, where vehicle telematics data indicate slow or light acceleration, the vehicle maintenance and/or charging model may output a score (or other output) that indicates the subject vehicle has been operated "better" than standard (and/or other selected benchmark operation) with respect to maintenance/charging.

As another example, vehicle telematics data associated with a subject vehicle's braking may be received and input to a vehicle maintenance and/or charging model. Such vehicle telematics data may be generated by and/or received from vehicle brake sensors, accelerometers, and the like. Hard and/or frequent braking (e.g., in stop-and-go traffic) may increase the wear on a vehicle's brake pads relative to standard braking (and/or other selected benchmark braking), whereas relatively light and/or infrequent braking may reduce such wear.

Accordingly, where vehicle telematics data indicate light and/or infrequent braking, the vehicle maintenance and/or charging model may output a score (or other output) that indicates the subject vehicle has been operated "better" than standard (and/or other selected benchmark operation) with respect to maintenance/charging. Likewise, where vehicle telematics data indicate hard and/or frequent braking, the vehicle maintenance and/or charging model may output a score (or other output) that indicates the subject vehicle has been operated "worse" than standard (and/or other selected benchmark operation) with respect to maintenance/charging.

In a further example, vehicle telematics data associated with a subject vehicle's cornering may be received and input to a vehicle maintenance and/or charging model. Such vehicle telematics data may be generated by and/or received from vehicle steering sensors, vehicle tire or wheel sensors, accelerometers, gyroscopes, and the like. Aggressive or sharp cornering may increase the stress on wheel bearings, bushings, suspension components, and/or other vehicle components, compared to standard cornering. On the other hand, slow and/or wide cornering may decrease such vehicle component stress.

Accordingly, where vehicle telematics data indicate slow and/or wide cornering, the vehicle maintenance and/or charging model may output a score (or other output) that indicates the subject vehicle has been operated "better" than standard (and/or other selected benchmark operation) with respect to maintenance/charging. Likewise, where vehicle telematics data indicate aggressive and/or sharp cornering, the vehicle maintenance and/or charging model may output a score (or other output) that indicates the subject vehicle has been operated "worse" than standard (and/or other selected benchmark operation) with respect to maintenance/charging.

As another example, vehicle telematics data associated with a subject vehicle's mileage may be received and input to a vehicle maintenance and/or charging model. Such vehicle telematics data may be received from a GPS system, a vehicle odometer, and the like. High or excessive mileage, relative to standard mileage, may increase wear and tear on many vehicle components, whereas relatively low mileage may decrease the standard wear and tear on those vehicle components.

Accordingly, where vehicle telematics data indicate relatively low mileage, the vehicle maintenance and/or charging model may output a score (or other output) that indicates the subject vehicle has been operated "better" than standard (and/or other selected benchmark operation) with respect to maintenance/charging. Likewise, where vehicle telematics data indicate high mileage (e.g., mileage above a pre-defined high-mileage threshold), the vehicle maintenance and/or charging model may output a score (or other output) that indicates the subject vehicle has been operated "worse" than standard (and/or other selected benchmark operation) with respect to maintenance/charging.

In addition, "on-road" versus "off-road" driving may have differing impacts on various vehicle components. "On-road" driving may refer generally to driving a subject vehicle on a paved road, whereas "off-road" driving may refer generally to driving a subject vehicle on non-paved terrain, such as gravel roads or non-road terrain. Driving off-road may increase the wear on, for example, vehicle tires, wheels, suspension systems, and the like. Vehicle telematics data such as GPS systems, vehicle suspension sensors, vehicle tire or wheel sensors, and the like, may indicate that a subject vehicle is being operated off-road.

In at least some embodiments, the VTA computing device may access a geofencing database that defines whether, based upon a location of a subject vehicle, the subject vehicle is being operated in an on-road or off-road location. The VTA computing device may apply the geofencing to the reference vehicle telematics data to determine what impact on-road versus off-road operation has on a vehicle, and incorporate that impact into the vehicle maintenance/charging model(s).

In addition, the VTA computing device may determine a standard amount and/or magnitude (e.g., how un-level the terrain is) of off-road driving. Accordingly, when vehicle telematics data is input to the vehicle maintenance/charging model(s), the model(s) may output a score indicating whether the vehicle's operation is more or less off-road than is standard (and/or other selected benchmark operation). Being more off-road may be considered "worse" operation than standard (and/or other selected benchmark operation), due to the impact of off-road driving on various vehicle components.

The vehicle maintenance/charging models may output a score for each individual factor described herein (e.g., acceleration, braking, etc.) and/or may output an overall score that incorporates all of the factors therein.

In some embodiments, that score is input to the pricing model to determine a pricing outcome, which may include a decreased maintenance and/or charging cost, an increased maintenance and/or charging cost, and/or a reward offer. Additionally or alternatively, the pricing model may be incorporated into the vehicle maintenance and/or charging model, such that vehicle maintenance data is input and a pricing outcome is output from a single model.

In various embodiments, the VTA computing device may also provide an interface (e.g., a "dashboard") through which a user may access reports, add or update user preferences, select which vehicle telematics data may be generated by and/or received from their client device (e.g., a smart phone or mobile device, wearable, smart glasses, etc.), and the like. The dashboard may be provided as a web-based interface, such as a smartphone or mobile device "app" and/or as a webpage provided to any suitable computing device, such as a client device.

Exemplary technical effects of the systems and methods described herein may include, for example: (a) receiving and processing vehicle telematics data to determine how operation of a subject vehicle compares to standard operation of like vehicles; (b) identifying, based upon such determinations, how non-standard usage may affect a maintenance and/or charging cost; (c) determining any required adjustments to a vehicle and/or charging cost; (d) providing an indication of adjusted cost(s) to a user in an itemized report; (e) enabling usage-based adjustment of one or more costs associated with a vehicle; and/or (f) associating operation of a vehicle with subsequent maintenance of that vehicle using vehicle telematics data that reflects actual usage of that vehicle.

The present disclosure facilitates using the vehicle telematics and/or sensor data—and/or data collected by an attached device (e.g., a beacon) or associated device (e.g., a paired smartphone or mobile device) to create maintenance and charging telematics models. These models allow vehicle manufacturers to offer their customers discounts and/or rewards based upon their driving behavior.

Currently, insurance companies may offer discounts based upon how safe a customer drives because better driving behavior lowers risks. In the same respect, some customers' driving habits could make their vehicles less expensive to maintain and/or charge.

The computer system described herein may use vehicle telematics data to build an algorithm that would allow vehicle manufacturers the ability to better anticipate future maintenance costs based upon how a person drives. This model may allow the vehicle manufacturers to discount warranty services, or provide perks for customers that would be predicted to have a lower cost of maintenance based upon their driving behavior. Furthermore, vehicle manufacturers who also have public charging networks would be able to offer discounts for customers who drive in a way that a vehicle telematics-based model predicts will lead to less demand on the charging infrastructure. These discounts or rewards models may allow customers to be rewarded for their driving behavior while assisting vehicle manufacturers in controlling maintenance and charging costs and increasing customer engagement.

Exemplary Computer System for Generating and Applying Vehicle Maintenance Models Based Upon Vehicle Telematics Data FIG. 1 is a schematic view of an exemplary computer system 100 for generating and applying vehicle maintenance models based upon vehicle telematics data. In one exemplary embodiment, system 100 may include a client device, such as a client device 102. In some embodiments, client device 102 includes and/or is associated with (e.g., paired with and/or coupled to) a vehicle 104. Client device 102 may be associated with an individual, such as a user of vehicle 104. System 100 may also include a network 106, a vehicle telematics analytics (VTA) computing device 108, and/or a database 110.

In the exemplary, client device 102 may be any personal computing device and/or any mobile communications device of a user, such as a personal computer, a tablet computer, a smartphone, wearable, mobile device, and the like. Client device 102 may additionally or alternatively include vehicle 104 and/or a computing device integral thereto (e.g., a vehicle controller). Client device 102 may additionally or alternatively include an external or third-party computing device or "beacon" coupled to vehicle 104 and configured to collect data (e.g., vehicle telematics data) associated with operation of vehicle 104.

Client device 102 may be configured to present an application (e.g., a smartphone or mobile device "app") or a webpage, such as webpage or an app for viewing reports, adding or updating user preferences, and the like. To this end, client device 102 may include or execute software, such as a web browser, for viewing and interacting with a webpage and/or an app.

Accordingly, in the exemplary embodiment, client device 102 (which may include vehicle 104) may include one or more computer systems configured to collect and/or generate vehicle telematics data. For example, client device 102 may include a plurality of sensors configured to monitor one or more vehicle components. Vehicle telematics data may be generated based upon data collected by the one or more sensors and analyzed, as described herein, to generate vehicle maintenance models and/or as inputs to vehicle maintenance models to determine how vehicle 104 is operated relative to standard operation of like vehicles. In certain embodiments, vehicle telematics data may also include environmental data generated by any number of sensors measuring environmental factors impacting the vehicle such as temperature, humidity, weather, and the like.

Network 106 may be any electronic communications system, such as any computer network or collection of computer networks, and may incorporate various hardware and/or software. Communication over network 106 may be accomplished via any suitable communication channels, such as, for example, one or more telephone networks, one or more extranets, one or more intranets, the Internet, one or more point of interaction devices (e.g., point of sale devices, smart phones, cellular phones, smart glasses, wearables, or other mobile devices), various online and/or offline communications systems, such as various local area and wide area networks, and the like.

VTA computing device 108 may include a web server and/or a database server. A web server, as used herein, may be any computer or computer system that is configured to receive and process requests made via HTTP. A web server may, in addition, function to store, process, and/or deliver one or more web pages and/or any other suitable content to client device 102. The web server may, in addition, receive data, such as data provided to the app and/or webpage (as described herein) from client device 102. A database server, as used herein, may be any computer or computer program that provides database services to one or more other computers or computer programs. A database server may, in addition, function to process data received from a web server.

Database 110 may be any organized collection of data, such as, for example, any data organized as part of a relational data structure, any data organized as part of a flat file, and the like. Database 110 may be communicatively coupled to VTA computing device 108 (e.g., a database server thereof) and may receive data from, and provide data to, VTA computing device 108, such as in response to one or more requests for data, which may be provided via a database management system (DBMS). Database 110 may store vehicle telematics data received from vehicle 104, as well as reference vehicle telematics data received from a plurality of like vehicles and used to generate or build the vehicle maintenance, charging, and/or pricing models. Database 110 may store any other data, such as industry vehicle maintenance data and/or any other data described herein.

Although the components of computer system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single VTA computing device 108 and a single database 110 are described above, it will be appreciated that system 100 may include any suitable number of interconnected, communicatively coupled, web servers, database servers, and/or databases. Further, although certain functions, processes, and operations are described herein with respect to one or more system components, it is contemplated that one or more other system components may perform the functions, processes, and operations described herein.

Exemplary Vehicle

Figure 2:
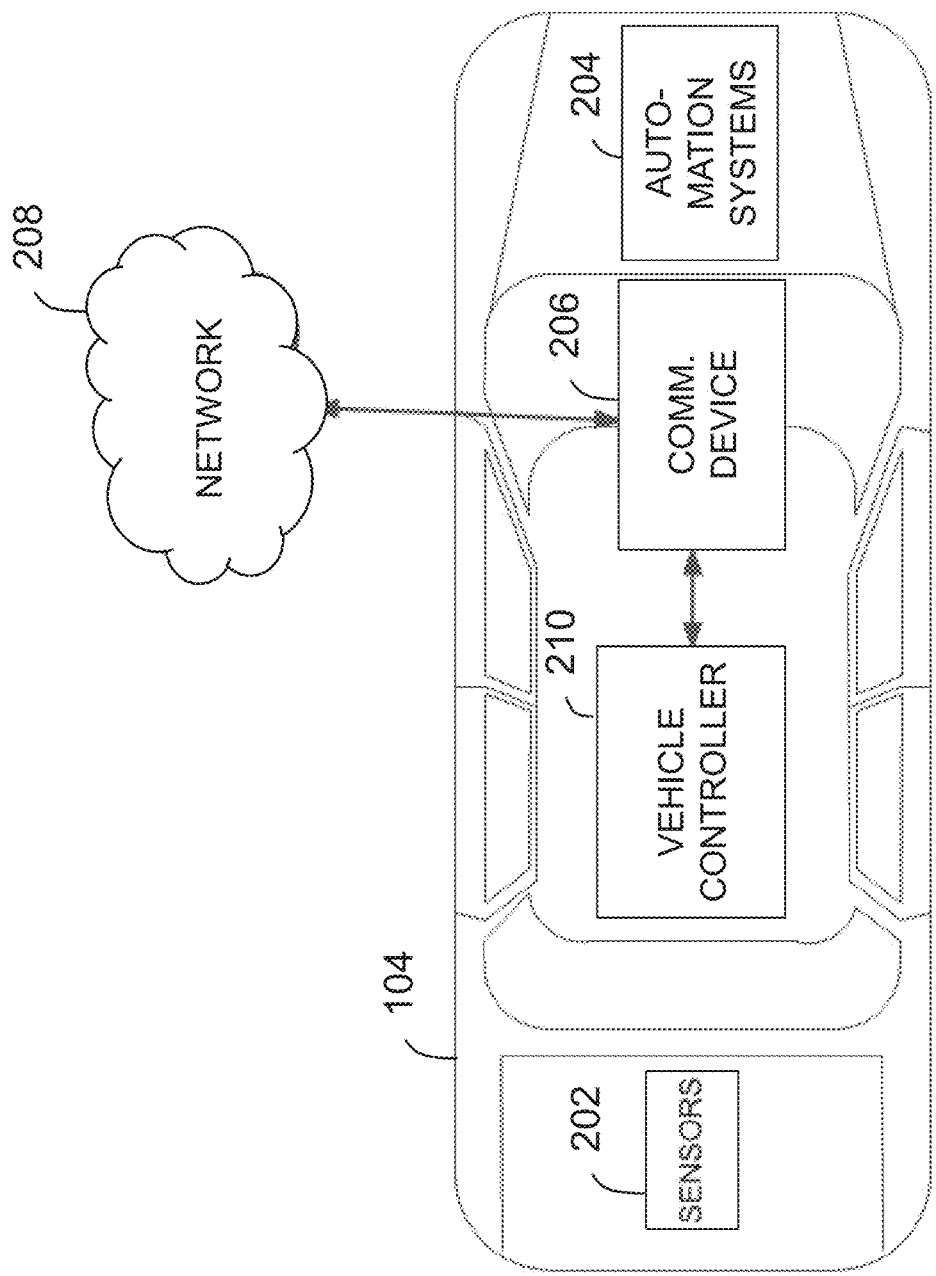
FIG. 2 illustrates an exemplary configuration of a vehicle that may be used in the computer system shown in FIG. 1.

FIG. 2 depicts a view of an exemplary vehicle 104. Vehicle 104 may include any kind of vehicle, such as, for example, cars, trucks, all-terrain vehicles (ATVs), motorcycles, recreational vehicles (RVs), snowmobiles, boats, industrial vehicles (e.g., construction vehicles), "riding" lawnmowers, smart farming equipment, ships, and so forth. Generally, vehicles 104 will be described herein using cars/trucks (e.g., personal vehicles) as examples. However, these examples should not be construed to limit the disclosure in any way, as the scope of the present disclosure may be applicable to any kind of vehicle, including those listed hereinabove, and including manual or non-autonomous, semi-autonomous, and/or autonomous vehicles.

Vehicle 104 may be capable of sensing aspects of its environment and, in some cases, assisting in or performing control aspects associated with piloting vehicle 104 (e.g., with or without human input, via automation systems, etc.). Vehicle 104 may include a plurality of sensors 202. The plurality of sensors 202 may detect the current surroundings and location of vehicle 104. Plurality of sensors 202 may include, but are not limited to, radar, LIDAR, GPS receivers, video devices, imaging devices, cameras, audio recorders, and computer vision.

Plurality of sensors 202 may also include sensors that detect conditions of vehicle 104, such as speed, acceleration, gear, braking, and other conditions related to the operation of vehicle 104, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. Furthermore, plurality of sensors 202 may include impact sensors that detect impacts to vehicle 104, including force and direction, and sensors that detect actions of vehicle 104, such the deployment of airbags.

Vehicle 104 may, in some embodiments, includes one or more automation system 204. Automation systems 204 may interpret the sensory information from sensors 202 while performing various operations. Automation systems 204 may include, for example, (a) fully autonomous (e.g., driverless) driving; (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (1) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. While not all sensor types for each particular automation system 204 are listed here, it should be understood that sensors 202 include any sensors sufficient to allow the associated automation system 204 to operate for its intended purpose. As such, each particular automation system 204 may utilize some data from sensors 202 to perform its underlying function.

In some embodiments, vehicle 104 may be able to communicate with one or more remote computer devices, such as a VTA computing device 108 (shown in FIG. 1), via one or more wireless networks 208 (which may include network 106, also shown in FIG. 1), using a communication device 206 (e.g., a wireless network adapter). Network 208 may include, for example, a cellular network, a satellite network, and a wireless vehicular ad-hoc network. Vehicle 104 may include multiple communication devices 206 for connecting to multiple different types of networks.

Vehicle 104 may also include an integral vehicle controller 210. Vehicle controller 210 may enable communication between components of vehicle 104, including sensors 202, automation system 204, and communication device 206. Vehicle controller 210 may additionally include on-board data storage such that data from sensors 202 and/or automations systems 204 may be stored on vehicle 104 until requested (e.g., from VTA computing device 108) and/or until periodic transmission thereof (e.g., to VTA computing device 108 and/or an external database).

Exemplary Client Device

Figure 3:
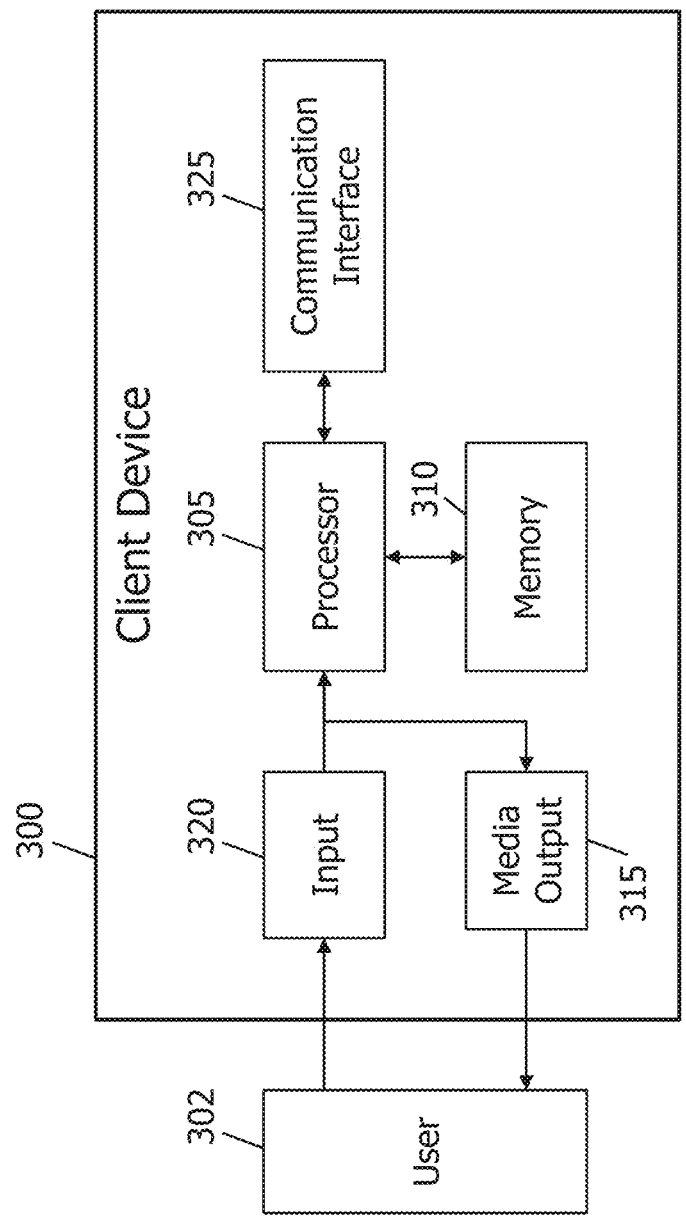
FIG. 3 illustrates an exemplary configuration of a client device that may be used in the computer system shown in FIG. 1.

FIG. 3 depicts an exemplary configuration of a client device 300, such as client device 102, as shown in FIG. 1, and in accordance with one embodiment of the present disclosure. Client device 300 may be operated by a user 302. Client device 300 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

Client device 300 may also include at least one media output component 315 for presenting information to user 302. Media output component 315 may be any component capable of conveying information to user 302. In some embodiments, media output component 315 may include an output adapter (not shown) such as a video adapter and/or an audio adapter. An output adapter may be operatively coupled to processor 305 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 302. A graphical user interface may include, for example, an online store interface for viewing and/or purchasing items, and/or a wallet application for managing payment information. In some embodiments, client device 300 may include an input device 320 for receiving input from user 302. User 302 may use input device 320 to, without limitation, select and/or enter data, such as, for example, one or more report criteria or report filters.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

Client device 300 may also include a communication interface 325, communicatively coupled via network 106 to VTA computing device 108 (both shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 302 via media output component 315 and, optionally, receiving and processing input from input device 320. A user interface may include, among other possibilities, a web browser and/or a client application. Web browsers enable users, such as user 302, to display and interact with media and other information typically embedded on a web page or a website.

Exemplary Server System

Figure 4:
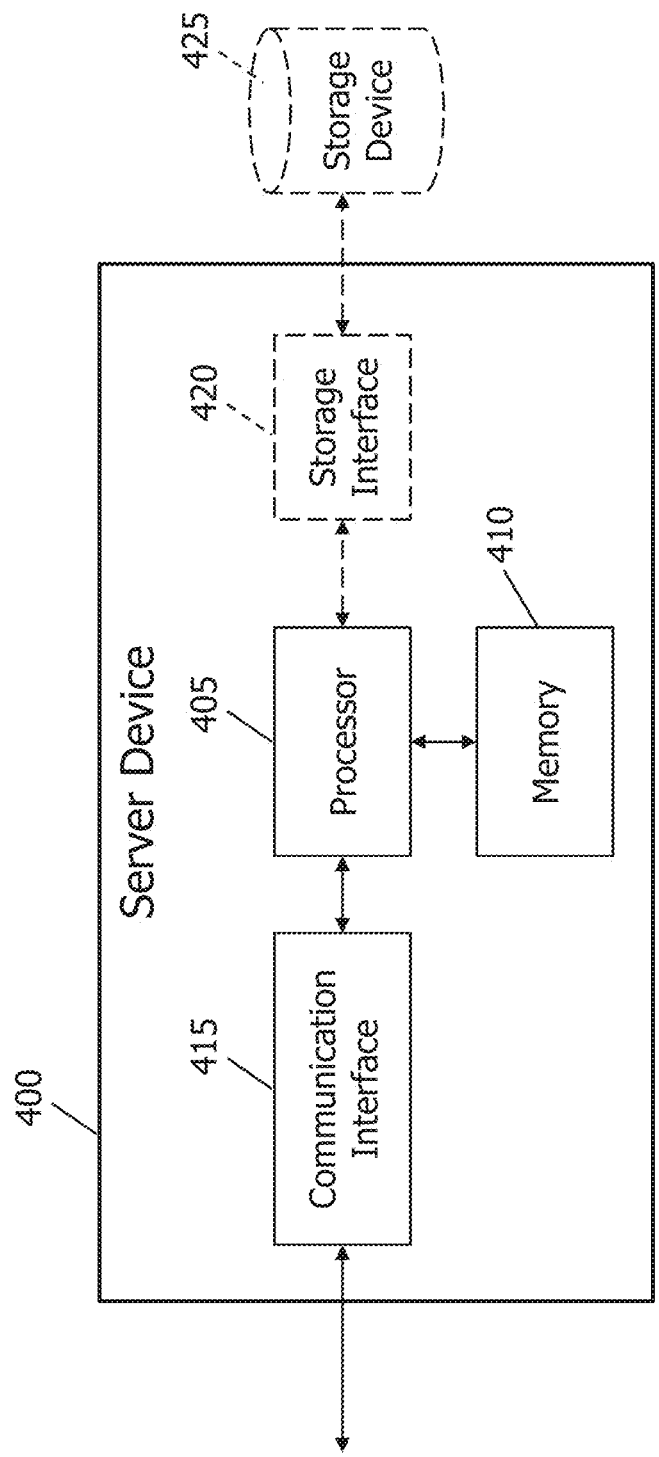
FIG. 4 illustrates an exemplary configuration of a server that may be used in the computer system shown in FIG. 1.

FIG. 4 depicts an exemplary server system 400 such as VTA computing device, as shown in FIG. 1, and in accordance with one exemplary embodiment of the present disclosure. Accordingly, server system 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server system 400 is capable of communicating with a remote computing device. For example, communication interface 415 may receive requests from client devices 102 via the Internet and/or over a computer network.

Processor 405 may also be operatively coupled to a storage device 425 (e.g., database 110, shown in FIG. 1). Storage device 425 may be any computer-operated hardware suitable for storing and/or retrieving data. In some embodiments, storage device 425 may be integrated in server system 400. For example, server system 400 may include one or more hard disk drives as storage device 425. In other embodiments, storage device 425 may be external to server system 400 and may be accessed by a plurality of server systems 400. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Figure 5:
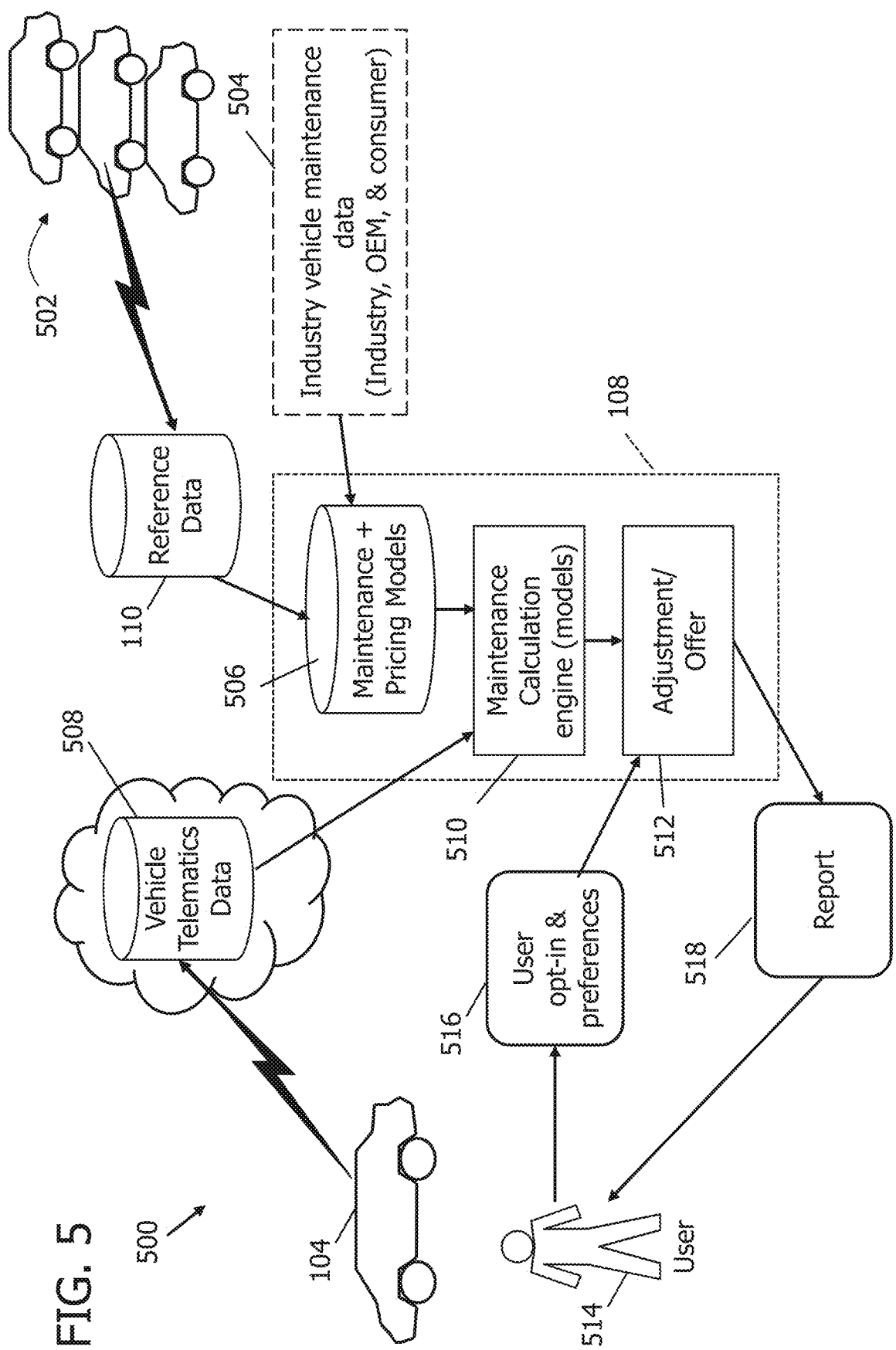
FIG. 5 is a schematic diagram illustrating an exemplary process for generating and applying usage-based vehicle maintenance models based upon vehicle telematics data, as implemented by the computer system shown at FIG. 1, and in accordance with various embodiments of the present disclosure.
Figure 6:
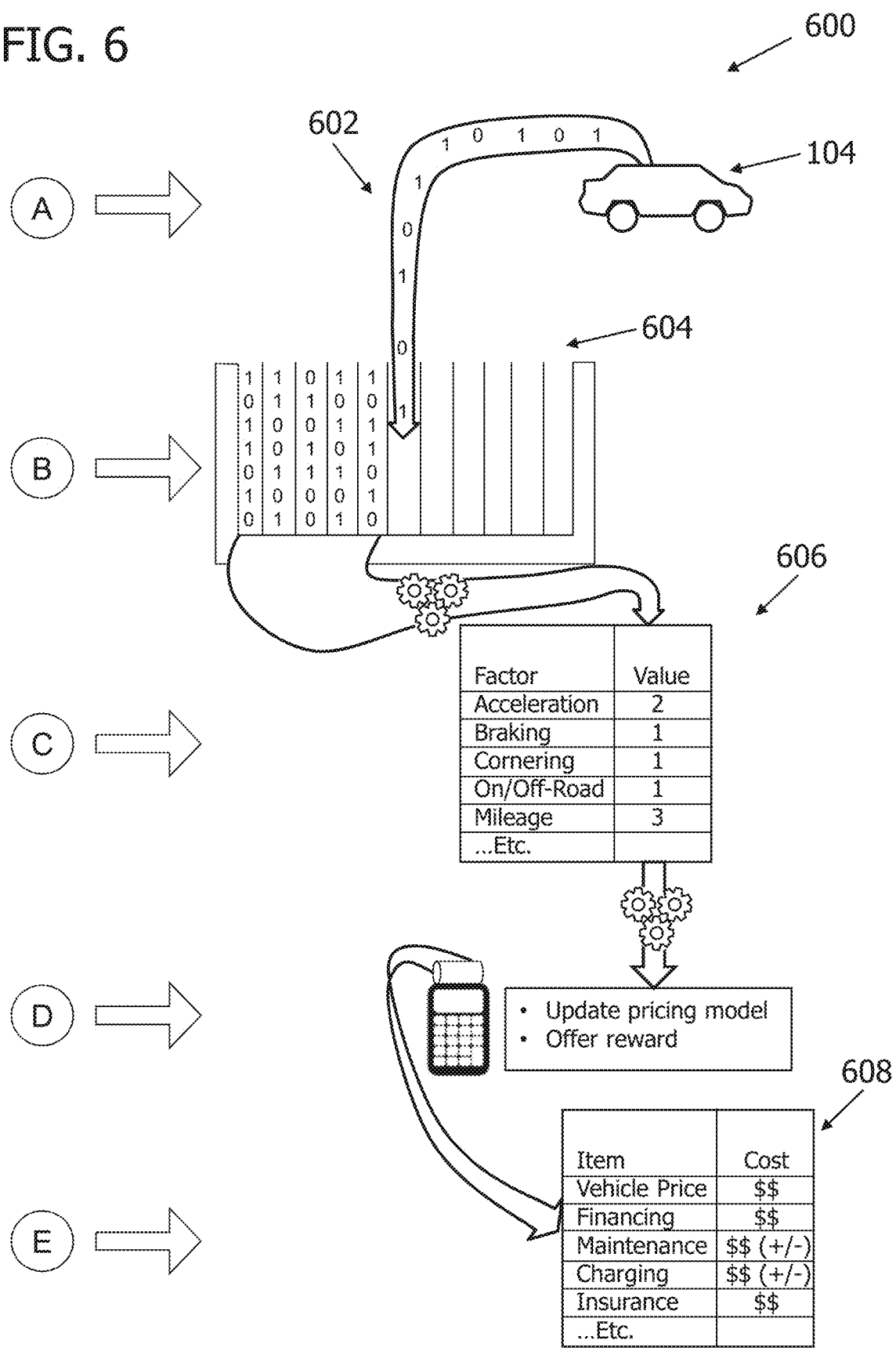
FIG. 6 is a schematic diagram illustrating an exemplary process for applying usage-based vehicle maintenance models to vehicle telematics data, as implemented by the computer system shown at FIG. 1, and in accordance with various embodiments of the present disclosure.
Figure 7:
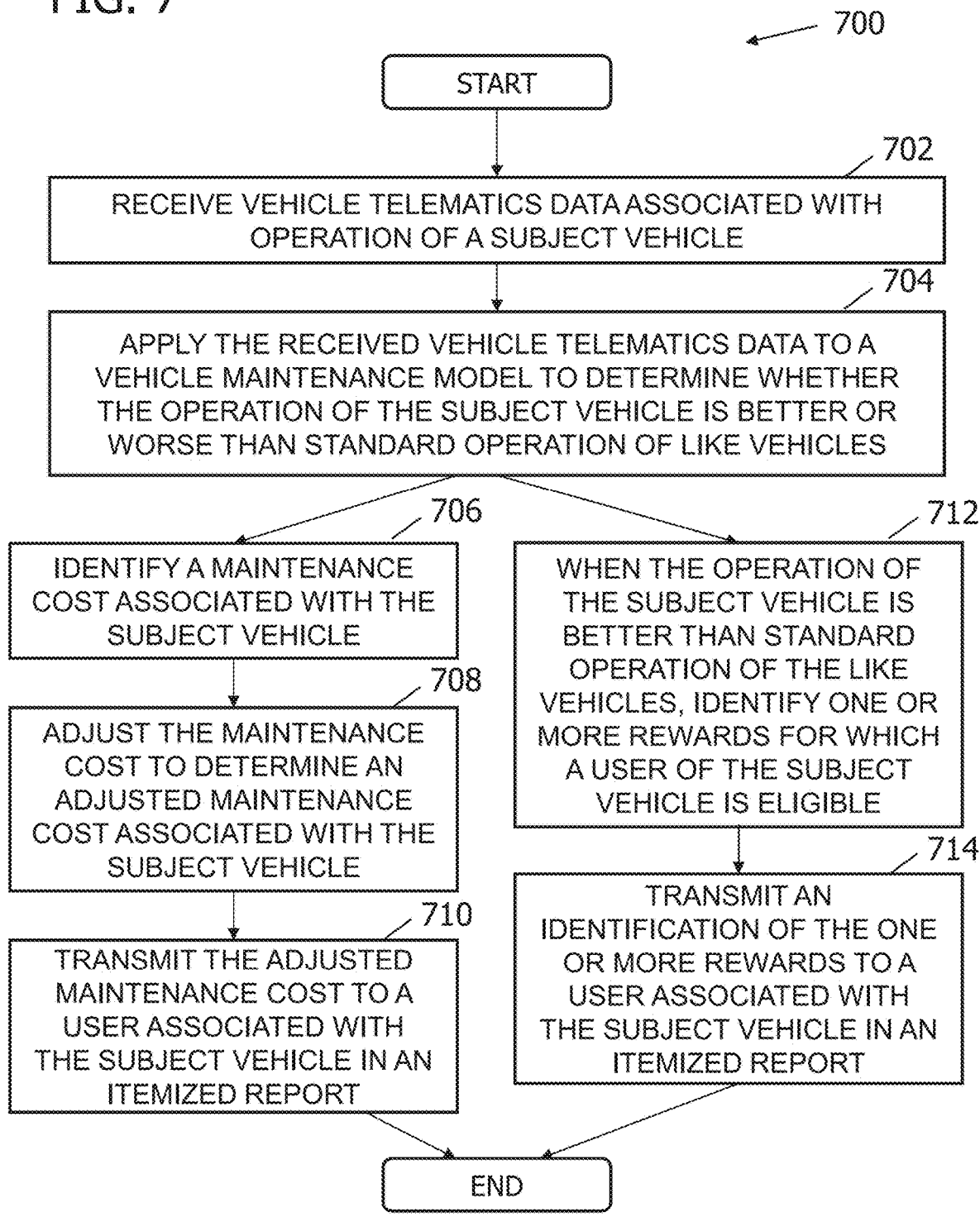
FIG. 7 is a flowchart illustrating an exemplary process for generating and applying vehicle maintenance and pricing models to vehicle telematics data, as implemented by the computer system shown at FIG. 1, and in accordance with various embodiments of the present disclosure.

Exemplary Processes for Generating a Vehicle Maintenance Model and Applying the Vehicle Maintenance Model to Vehicle Telematics Data for a Subject Vehicle FIG. 5-7 illustrates processes for generating a vehicle maintenance model and applying the vehicle maintenance model to vehicle telematics data for a subject vehicle.

Although each of the processes described below may be implemented independently, it will be understood that the steps included in each of the processes described below may be variously interchanged and/or combined as desired.

FIG. 5 is a schematic diagram illustrating an exemplary process 500 for generating and applying usage-based vehicle maintenance models based upon vehicle telematics data, as implemented by computer system 100 (shown at FIG. 1). As shown, reference vehicle telematics data from a plurality of reference vehicles 502 may be collected and stored in a reference database, which may include database 110. In addition, industry vehicle maintenance data 504 may be collected from a variety of data sources, as described above. This reference vehicle telematics data and industry vehicle maintenance data may be combined and analyzed (e.g., by VTA computing device 108) to generate vehicle maintenance (and/or charging) and pricing models (which may be a single model or multiple models).

Subsequently, a subject vehicle 104 may transmit (subject) vehicle telematics data 508 to VTA computing device 108. VTA computing device 108 may execute a maintenance calculation engine 510 to apply the vehicle maintenance model to vehicle telematics data 508, and determine (based upon an output from the model) whether operation of subject vehicle 104 is better or worse than standard operation of like reference vehicles 502, or whether such operation is standard. Based upon such a determination, VTA computing device 108 determines an adjusted maintenance cost and/or reward 512 to offer a user 514 associated with subject vehicle 104. In some embodiments, VTA computing device 108 may confirm whether user 514 has provided any user preferences 516 that indicate how user 514 would prefer to receive any rewards and/or adjust maintenance costs.

VTA computing device 108 may then transmit a report 518 to user 514 (e.g., via a client device 102, shown in FIG. 1). Report 518 may include itemized costs associated with subject vehicle 104, including any adjusted vehicle maintenance cost (and/or adjusted charging cost) and/or reward.

FIG. 6 is a schematic diagram illustrating another exemplary computer-implemented process 600 for applying vehicle telematics data to a vehicle maintenance model, as implemented by computer system 100 (shown at FIG. 1), and in accordance with various embodiments of the present disclosure. As described above, process 600 may be implemented independently and/or in conjunction with one or more other process(es) (described herein) for generating and/or applying vehicle maintenance models based upon vehicle telematics data.

Process 600 includes step A, receiving vehicle telematics data 602 from a subject vehicle 104, and step B, appending the received vehicle telematics data 602 to stored telematics data 604 for subject vehicle 104. Process 600 further includes processing stored telematics data 604 (e.g., using a vehicle maintenance model) to generate (e.g., estimate, calculate) trip data 606, which may include a ranking, score, or other value for each of a plurality of factors of operation of subject vehicle 104 during one or more trips taken using subject vehicle 104. Values may be quantitative (e.g., a score out of 100) and/or qualitative (e.g., one of poor, fair/standard, and good). Process 600 includes step D, using trip data 606 as an input to a pricing model to identify an adjusted one-time or periodic maintenance. Additionally or alternatively, Step D may include offering a reward to the user (e.g., other than a discount on a maintenance cost), such as a merchandise credit, charging credit, and the like.

Process 600 further includes step E, transmitting a report 608 (e.g., a bill or statement) to the user. Report 608 may include, in the exemplary embodiment, an itemized list of each cost that factors in to a total amount charged to a user for operation of subject vehicle 104. Report 608 may also include an indicator as to whether each cost has increased or decreased from a previous report (not shown) and, in some cases, an explanation of why (e.g., "You earned a $10.00 maintenance discount because you drove safely.") Where a user is offered a reward (e.g., rather than or in addition to a discount on a maintenance cost), the reward may also be indicated on report 608 (e.g., "You earned $10.00 in credit towards a branded gift.").

FIG. 7 is a schematic diagram illustrating another exemplary computer-implemented process 700 for applying vehicle maintenance and pricing models to vehicle telematics data, as implemented by the system, as implemented by computer system 100 (shown at FIG. 1), and in accordance with various embodiments of the present disclosure. As described above, process 700 may be implemented independently and/or in conjunction with one or more other process(es) (described herein) for automatically allocating periodic maintenance contributions to a maintenance savings account based upon vehicle telematics data.

In the exemplary embodiment, process 700 includes receiving 702 vehicle telematics data associated with operation of a subject vehicle, and applying 704 the received vehicle telematics data to a vehicle maintenance model to determine whether the operation of the subject vehicle is better or worse than standard operation of like vehicles.

Process 700 may include identifying 706 a maintenance cost associated with the subject vehicle, adjusting 708 the maintenance cost to determine an adjusted maintenance cost associated with the subject vehicle based upon whether the operation of the subject vehicle is better or worse than standard operation of the like vehicles, and transmitting 710 the adjusted maintenance cost to a user associated with the subject vehicle in an itemized report including one or more other vehicle costs.

Additionally or alternatively, process 700 may include, when the operation of the subject vehicle is better than standard operation of the like vehicles, identifying 712 one or more rewards for which a user of the subject vehicle is eligible, and transmitting 714 an identification of the one or more rewards to a user associated with the subject vehicle in an itemized report including one or more other vehicle costs.

Exemplary Embodiments & Functionality

In one aspect, a vehicle telematics analytics (VTA) computing device including a memory and a processor in communication with the memory may be provided. The processor may be programmed to: (i) receive vehicle telematics data associated with operation of a subject vehicle, (ii) apply the received vehicle telematics data to a vehicle maintenance model to determine whether the operation of the subject vehicle is better or worse than standard operation of like vehicles, (iii) identify a maintenance cost associated with the subject vehicle, (iv) adjust the maintenance cost to determine an adjusted maintenance cost associated with the subject vehicle based upon whether the operation of the subject vehicle is better or worse than standard operation of the like vehicles, and/or (v) transmit the adjusted maintenance cost to a user associated with the subject vehicle in an itemized report including one or more other vehicle costs.

In one enhancement, the processor may be further programmed to: (a) access a database including reference vehicle telematics data associated with the like vehicles, and/or (b) build the vehicle maintenance model based upon the reference vehicle telematics data, the vehicle maintenance model defining standard operation of the like vehicles.

In another enhancement, to adjust the maintenance cost, the processor may be further programmed to provide an output of the vehicle maintenance model to a pricing model that defines standard maintenance costs associated with standard operation of the like vehicles. In some embodiments, the pricing model may output the adjusted maintenance cost.

In a further enhancement, the vehicle telematics data may be generated by the subject vehicle, and wherein to receive the vehicle telematics data, the processor may be further programmed to receive the vehicle telematics data from the subject vehicle. Additionally or alternatively, the vehicle telematics data may be generated by an external computing device coupled to the subject vehicle, and wherein to receive the vehicle telematics data, the processor may be further programmed to receive the vehicle telematics data from the external computing device. Additionally or alternatively, the vehicle telematics data may be generated by a user computing device of a user associated with the subject vehicle, the user computing device communicatively coupled to the subject vehicle during operation of the subject vehicle by the user, and wherein to receive the vehicle telematics data, the processor may be further programmed to receive the vehicle telematics data from the user computing device.

In another aspect, a vehicle telematics analytics (VTA) computing device including a memory and a processor in communication with the memory may be provided. The processor may be programmed to: (i) receive vehicle telematics data associated with operation of a subject vehicle, (ii) apply the received vehicle telematics data to a vehicle maintenance model to determine whether the operation of the subject vehicle is better or worse than standard operation of like vehicles, (iii) when the operation of the subject vehicle is better than standard operation of the like vehicles, identify one or more rewards for which a user of the subject vehicle is eligible, and/or (iv) transmit an identification of the one or more rewards to a user associated with the subject vehicle in an itemized report including one or more other vehicle costs.

In one enhancement, the reward includes one or more of a vehicle charging credit, a merchandise credit, and a warranty extension.

In one enhancement, the processor may be further programmed to: (a) access a database including reference vehicle telematics data associated with the like vehicles, and/or (b) build the vehicle maintenance model based upon the reference vehicle telematics data, the vehicle maintenance model defining standard operation of the like vehicles.

In a further enhancement, the vehicle telematics data may be generated by the subject vehicle, and wherein to receive the vehicle telematics data, the processor may be further programmed to receive the vehicle telematics data from the subject vehicle. Additionally or alternatively, the vehicle telematics data may be generated by an external computing device coupled to the subject vehicle, and wherein to receive the vehicle telematics data, the processor may be further programmed to receive the vehicle telematics data from the external computing device. Additionally or alternatively, the vehicle telematics data may be generated by a user computing device of a user associated with the subject vehicle, the user computing device communicatively coupled to the subject vehicle during operation of the subject vehicle by the user, and wherein to receive the vehicle telematics data, the processor may be further programmed to receive the vehicle telematics data from the user computing device.

In a further enhancement, the processor may be further programmed to: (a) retrieve, from the memory, a user preference set by the user and associated with rewards, (b) select, from the one or more rewards for which the user is eligible, a preferred reward that satisfies the user preference, and/or (c) transmit the identification of the preferred reward to the user in the itemized report.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models (e.g., maintenance, charging, and/or pricing models, which may be part of a single model or be separate models) may be created based upon example inputs in order to make valid and reliable predictions for novel inputs.

Additionally or alternatively, the machine learning programs may be trained by inputting sample data sets or certain data into the programs, such as vehicle telematics data, and/or industry vehicle maintenance data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Exemplary Features

The present embodiments may relate to (i) developing distinct usage-based/telematics models to price maintenance costs and charging costs; and (ii) developing a business model which combines the above costs of owning/subscribing and using a vehicle.

For instance, in one embodiment, an entity, such as an auto manufacturer, may customize and price for ownership/subscription/leasing, and usage costs including a combination of the following: (a) Car Price (Principal/Subscription/Lease Cost); (b) Finance (Interest); (c) Charging Costs; (d) Maintenance; and/or (e) Insurance. A customer could select a package including some but not all of the above options (excepting that the Price and Finance may likely always be part of the package).

The new business model may include: (i) standard auto purchasing with built in maintenance/charging costs; (ii) auto leasing with maintenance costs included; and/or (iii) subscription, shared purchase—i.e., several customers may buy the car as a group and share it among the neighborhood.

For charging costs and maintenance, discounts could be provided to customers in a variety of forms including: a refund of some of the money paid, a discount provided for the following month, free or discounted charging, rewards that could be used on items for the car, or even free items like coffee.

The present embodiments may also be an extension of an existing maintenance package and/or warranty based upon driving behavior. As an example, a customer whose driving score within a maintenance model was above a certain threshold would have the opportunity to purchase an extended maintenance package/warranty. This could be another benefit or reward that companies could offer their customers in addition to being a warranty/maintenance 'underwriting' model.

In one embodiment, each of these costs would be shown on the bill (monthly payment price) provided to the owner/subscriber/leaseholder. Additionally, although maintenance packages from dealerships exist today, they may be effectively prepaid and packaged with the principal based upon a model which cannot incorporate current telematics data. Such a model might make it possible for dealerships to extend coverage to more usage-based repair costs, such as brake pads, changing the pricing and coverage of such a product in tandem.

The regulations surrounding Private Passenger Auto (PPA) insurance policies are very thorough and may differ greatly by state. Some states may not allow use of telematics or usage-based variables beyond mileage. The regulations surrounding maintenance and charging packages may be significantly less cumbersome. This creates an opportunity to use telematics for pricing purposes in states in which telematics is not allowed in PPA insurance.

These analytical telematics models used to price maintenance and charging costs may include (but are not limited to) typical factors such as acceleration, braking, cornering, and mileage. Variables based upon weather (e.g., rain/snow) or data from geofencing, such as driving on or off-road, may be included With the present embodiments, a standard price may be charged for maintenance and charging at purchase or beginning of lease/subscription. Then discounts may be applied using the analytical models to assist pricing of these discounts. Telematics data may be collected by the car and/or a beacon. Maintenance data may be provided by the manufacture. Model development may include maintenance data from third parties, such as CarFax or another manufacturer.

Some examples of how variables and data sources that may be collected and analyzed relate to off-road driving, braking, acceleration, and/or cornering. For instance, geofencing may be used to determine when to collect telematics and/or other data related to off-road driving. Braking easier or harder will impact the life of brake pads, and braking data may be collected and analyzed to determine or estimate expected brake pad life. Heavy or light acceleration will use more or less battery life than normal acceleration, and therefore may require more or less frequent charging, respectively, which in turn will put a larger or lighter strain on the charging infrastructure. And aggressive cornering may put more stress on wheel bearings, bushings, suspension components and more. Monitoring cornering, and collecting telematics data related to cornering for analysis may significantly impact pricing for a maintenance pricing model.

The present embodiments may price maintenance and charging costs based upon usage. The present embodiments may therefore provide an analytics-as-a-service play which: provides further access to auto manufacturer data; assists in developing relationships with one or more auto manufacturers; and/or creates an opportunity to sell additional services.

In summary, some aspects focus on using the vehicle sensor data and/or data collected by an attached device (beacon) or mobile device to create maintenance and charging telematics models. These models may allow manufacturers or other entities to offer their customers rewards based upon their driving behavior.

Currently insurance companies offer discounts based upon how safe a customer drives because better driving behavior lowers risks. In the same respect, some customers' driving habits could make their vehicles less expensive to maintain and/or charge.

Thus telematics data may be used to build an algorithm that would allow auto manufactures or other entities the ability to better anticipate future maintenance costs based upon how a person drives. This model may allow the auto manufactures or other entities to discount warranty services, or provide perks for customers that would be predicted to have a lower cost of maintenance based upon driving behavior. Furthermore, auto manufacturers who also have public charging networks may be able to offer discounts for customers who drive in a way which a telematics model predicts will lead to less demand on the charging infrastructure. These discounts or rewards models may allow customers to be rewarded for their driving behavior, while assisting auto manufacturers in controlling maintenance and charging costs and increasing customer engagement.

Exemplary Methods

In one aspect, a computer-implemented method for using vehicle telematics data to determine a usage-based vehicle maintenance cost may be provided. The method may be implemented by one or more processors and/or associated transceivers. The method may include (1) receiving, by the one or more processors and/or associated transceivers, vehicle telematics data associated with operation of a subject vehicle, such as via wireless communication or data transmission collect by and/or transmitted from the subject vehicle or a user mobile device over one or more radio frequency links; (2) applying, by the one or more processors, the received vehicle telematics data to a vehicle maintenance model to determine whether the operation of the subject vehicle is better or worse than standard operation of like vehicles; (3) identifying, by the one or more processors, a maintenance cost associated with the subject vehicle; (4) adjusting, by the one or more processors, the maintenance cost to determine an adjusted maintenance cost associated with the subject vehicle based upon whether the operation of the subject vehicle is better or worse than standard operation of the like vehicles; and/or (5) transmitting, by the one or more processors and/or associated transceivers, the adjusted maintenance cost to a user associated with the subject vehicle in an itemized report including one or more other vehicle costs. The method may include additional, less, or alternate functionality, including that discussed elsewhere.

For instance, the method may include accessing, via the one or more processors, a database including reference vehicle telematics data associated with the like vehicles; and/or building, via the one or more processors, the vehicle maintenance model based upon the reference vehicle telematics data, the vehicle maintenance model defining standard operation of the like vehicles. Additionally, to adjust the maintenance cost, the one or more processors may be further programmed to provide an output of the vehicle maintenance model to a pricing model that defines standard maintenance costs associated with standard operation of the like vehicles.

The vehicle telematics data may be generated by the subject vehicle, and wherein to receive the vehicle telematics data, the one or more processors and/or associated transceivers may be further programmed to receive the vehicle telematics data from the subject vehicle. Additionally or alternatively, the vehicle telematics data may be generated by a customer mobile device, and wherein to receive the vehicle telematics data, the one or more processors and/or associated transceivers may be further programmed to receive the vehicle telematics data directly or indirectly from the customer mobile device. Additionally or alternatively, the vehicle telematics data may be generated by an external computing device coupled to the subject vehicle, and wherein to receive the vehicle telematics data, the one or more processors and/or associated transceivers may be further programmed to receive the vehicle telematics data from the external computing device.

In another aspect, a computer-implemented method for using vehicle telematics data to determine a usage-based vehicle maintenance cost may be provided. The method may include being implemented by one or more processors and/or associated transceivers. The method may include (1) receiving, via the one or more processors and/or associated transceivers, vehicle telematics data associated with operation of a subject vehicle, such as receiving via wireless communication or data transmission vehicle telematics data generated by and transmitted from the subject vehicle or a customer mobile device over one or more radio frequency links; (2) applying, via the one or more processors, the received vehicle telematics data to a vehicle maintenance model to determine whether the operation of the subject vehicle is better or worse than standard operation of like vehicles; (3) when the operation of the subject vehicle is better than standard operation of the like vehicles, identifying, via the one or more processors, one or more rewards for which a user of the subject vehicle is eligible; and/or (4) transmitting, via the one or more processors and/or associated transceivers, an identification of the one or more rewards to a user associated with the subject vehicle in an itemized report including one or more other vehicle costs. The reward may include one or more of a vehicle charging credit, a merchandise credit, and a warranty extension. The method may include additional, less, or alternate functionality, including that discussed elsewhere herein.

The method may further include: (a) accessing a database including reference vehicle telematics data associated with the like vehicles, and/or (b) building the vehicle maintenance model based upon the reference vehicle telematics data, the vehicle maintenance model defining standard operation of the like vehicles.

The vehicle telematics data may be generated by the subject vehicle, and wherein to receive the vehicle telematics data, the one or more processors and/or associated transceivers may be further programmed to receive the vehicle telematics data from the subject vehicle. Additionally or alternatively, the vehicle telematics data may be generated by a customer mobile device, and wherein to receive the vehicle telematics data, the one or more processors and/or associated transceivers may be further programmed to receive the vehicle telematics data directly or indirectly from the customer mobile device. Additionally or alternatively, the vehicle telematics data may be generated by an external computing device coupled to the subject vehicle, and wherein to receive the vehicle telematics data, the one or more processors and/or associated transceivers may be further programmed to receive the vehicle telematics data from the external computing device.

The method may further include: (a) retrieving, from the memory, a user preference set by the user and associated with rewards, and/or (b) selecting, from the one or more rewards for which the user is eligible, a preferred reward that satisfies the user preference, wherein transmitting the identification to the user may include transmitting the identification of the preferred reward to the user in the itemized report.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington).

In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method for using vehicle telematics data to determine a usage-based vehicle maintenance cost, the method being implemented by one or more processors and/or associated transceivers, the method comprising:

generating a vehicle maintenance and charging model, the vehicle maintenance and charging model defining standard operation of a plurality of vehicles based upon a combination of industry vehicle maintenance data with reference telematics data captured from a plurality of reference vehicles, and (ii) standard charging characteristics of the plurality of vehicles based upon the reference telematics data and historical charging data from a plurality of charging stations, the standard operation and charging characteristics including a threshold or range for a plurality of factors including acceleration, braking, cornering, mileage, and vehicle positional data relative to a maintenance schedule and charging frequency, duration, and location relative to a charging schedule;

receiving, by the one or more processors, from a user computing device of a user associated with a subject vehicle, first vehicle telematics data associated with operation of the subject vehicle, the first vehicle telematics data captured over a period of time after the user acquired the subject vehicle and including sensor data from a user-defined subset of device sensors associated with the subject vehicle, wherein the subject vehicle has associated therewith a periodic maintenance cost with an initial value predetermined at a time when the user acquired the subject vehicle;

using the first vehicle telematics data as input, executing the vehicle maintenance and charging model to compare the first vehicle telematics data to the threshold values or ranges for the plurality of factors;

receiving, by the one or more processors as output from the vehicle maintenance and charging model, a plurality of quantitative scores corresponding to the plurality of factors, the plurality of quantitative scores indicating the user's operation of the subject vehicle is better than standard operation of like vehicles and the user's vehicle is likely to require reduced or delayed maintenance and (ii) will put reduced burden on charging infrastructure compared to the like vehicles over a future period of time;

automatically adjusting, by the one or more processors, the periodic maintenance cost to have an adjusted value less than the initial value by an amount proportional to the reduced burden on the charging infrastructure, based upon the plurality of quantitative scores output from the vehicle maintenance and charging model; and transmitting, by the one or more processors and/or associated transceivers, an itemized report to the user associated with the subject vehicle, the itemized report including a representation of how the operation of the subject vehicle is better than standard operation of the like vehicles based upon the plurality of qualitative scores, an identification of the adjusted value of the periodic maintenance cost, a representation of the decrease from the initial value of the periodic maintenance cost and the adjusted value of the periodic maintenance cost, and one or more other vehicle costs.

2. The computer-implemented method of claim 1, wherein generating the vehicle maintenance and charging model comprises accessing, via the one or more processors, a database including the reference telematics data associated with the like vehicles.

3. The computer-implemented method of claim 1, wherein adjusting the periodic maintenance cost comprises providing the plurality of quantitative output from the vehicle maintenance and charging model to a pricing model that defines standard maintenance costs associated with standard operation of the like vehicles, wherein the pricing model outputs the adjusted value of the periodic maintenance cost.

4. The computer-implemented method of claim 1, the method further comprising:
receiving second vehicle telematics data captured using vehicle sensors disposed on the subject vehicle over the period of time, from the subject vehicle; and
re-executing the vehicle maintenance and charging model using the first and second vehicle telematics data as input to receive an updated output therefrom.

5. The computer-implemented method of claim 1, wherein first vehicle telematics data is captured at the device sensors disposed in the user computing device over the period of time, the user computing device communicatively coupled to the subject vehicle during operation of the subject vehicle by the user.

6. The computer-implemented method of claim 1, the method further comprising:
receiving third vehicle telematics data, captured using external sensors disposed in an external computing device coupled to the vehicle, from the external computing device; and
re-executing the vehicle maintenance and charging model using the first and third vehicle telematics data as input to receive an updated output therefrom.

7. A vehicle telematics analytics (VTA) computing device comprising a memory and a processor in communication with the memory, the processor programmed to:
generate a vehicle maintenance and charging model, the vehicle maintenance and charging model defining (i) standard operation of a plurality of vehicles based upon a combination of industry vehicle maintenance data with reference telematics data captured from a plurality of reference vehicles, and (ii) standard charging characteristics of the plurality of vehicles based upon the reference telematics data and historical charging data from a plurality of charging stations, the standard operation and charging characteristics including a threshold or range for a plurality of factors including acceleration, braking, cornering, mileage, and vehicle positional data relative to a maintenance schedule and charging frequency, duration, and location relative to a charging schedule;
receive, from a user computing device of a user associated with a subject vehicle, first vehicle telematics data associated with operation of the subject vehicle, the first vehicle telematics data captured over a period of time after the user acquired the subject vehicle and including sensor data from a user-defined subset of device sensors associated with the subject vehicle, wherein the subject vehicle has associated therewith a periodic maintenance cost with an initial value predetermined at a time when the user acquired the subject vehicle;
using the first vehicle telematics data as input, execute the vehicle maintenance and charging model to compare the first vehicle telematics data to the threshold values or ranges for the plurality of factors;
receive, as output from the vehicle maintenance and charging model, a plurality of quantitative scores corresponding to the plurality of factors, the plurality of quantitative scores indicating the user's operation of the subject vehicle is better than standard operation of like vehicles and the user's vehicle is likely to require reduced or delayed maintenance and (ii) will put reduced burden on charging infrastructure compared to the like vehicles over a future period of time;
automatically adjust the periodic maintenance cost to have an adjusted value less than the initial value by an amount proportional to the reduced burden on the charging infrastructure, based upon the plurality of quantitative scores output from the vehicle maintenance and charging model; and
transmit an itemized report to the user associated with the subject vehicle, the itemized report including a representation of whether the operation of the subject vehicle is better or worse than standard operation of the like vehicles, an identification of the adjusted value of the periodic maintenance cost, a representation of the decrease from the initial value of the periodic maintenance cost and the adjusted value of the periodic maintenance cost, and one or more other vehicle costs.

8. The VTA computing device of claim 7, wherein the processor is further programmed to generate the vehicle maintenance and charging model by accessing a database including the reference telematics data associated with the like vehicles.

9. The VTA computing device of claim 7, wherein to adjust the periodic maintenance cost, the processor is further programmed to provide the plurality of quantitative scores output from the vehicle maintenance and charging model to a pricing model that defines standard maintenance costs associated with standard operation of the like vehicles, wherein the pricing model outputs the adjusted value of the periodic maintenance cost.

10. The VTA computing device of claim 7, wherein the processor is further programmed to:
receive second vehicle telematics data, captured using vehicle sensors disposed on the subject vehicle over the period of time, from the subject vehicle; and
re-execute the vehicle maintenance and charging model using the first and second vehicle telematics data as input to receive an updated output therefrom.

11. The VTA computing device of claim 7, wherein the processor is further programmed to:
receive third vehicle telematics data, captured using external sensors disposed in an external computing device coupled to the vehicle, from the external computing device; and
re-execute the vehicle maintenance and charging model using the first and third vehicle telematics data as input to receive an updated output therefrom.

12. The VTA computing device of claim 7, wherein the first vehicle telematics data is captured at the device sensors disposed in the user computing device over the period of time, the user computing device communicatively coupled to the subject vehicle during operation of the subject vehicle by the user.

13. The VTA computing device of claim 7, wherein the processor is further configured to:

receive, from the user computing device, a request for the itemized report; and in response to receiving the request, execute retrieval of the first vehicle telematics data from the user computing device and second vehicle telematics data from the subject vehicle or an external computing device coupled to the subject vehicle.

14. The VTA computing device of claim 7, wherein the processor is further configured to:

upon completion of any trip performed using the subject vehicle or any charging session completed at the subject vehicle, receive updated first vehicle telematics from the subset of device sensors of the user computing device;

in response to receiving the updated first telematics data, automatically re-execute the vehicle maintenance and charging model using the updated first telematics data as input; and continuously receive the plurality of quantitative scores output from the vehicle maintenance and charging model based on the updated first vehicle telematics data.

15. The VTA computing device of claim 14, wherein the processor is further configured to:

receive, from the user computing device, a request for the itemized report; and in response to receiving the request, generate the itemized report based upon most recent scores of the plurality of quantitative scores output from the vehicle maintenance and charging model.

16. A non-transitory computer-readable storage media having computer-executable instructions embodied thereon, wherein when executed by a vehicle telematics data (VTA) computing device having at least one processor in communication with at least one memory, the computer-executable instructions cause the at least one processor to:

generate a vehicle maintenance and charging model, the vehicle maintenance and charging model defining standard operation of a plurality of vehicles based upon a combination of industry vehicle maintenance data with reference telematics data captured from a plurality of reference vehicles, and (ii) standard charging characteristics of the plurality of vehicles based upon the reference telematics data and historical charging data from a plurality of charging stations, the standard operation and charging characteristics including a threshold or range for a plurality of factors including acceleration, braking, cornering, mileage, and vehicle positional data relative to a maintenance schedule and charging frequency, duration, and location relative to a charging schedule;

receive, from a user computing device of a user associated with a subject vehicle, first vehicle telematics data associated with operation of the subject vehicle, the first vehicle telematics data captured over a period of time after the user acquired the subject vehicle and including sensor data from a user-defined subset of device sensors associated with the subject vehicle, wherein the subject vehicle has associated therewith a periodic maintenance cost with an initial value predetermined at a time when the user acquired the subject vehicle;

using the first vehicle telematics data as input, execute the vehicle maintenance and charging model to compare the first vehicle telematics data to the threshold values or ranges for the plurality of factors;

receive, as output from the vehicle maintenance and charging model, a plurality of quantitative scores corresponding to the plurality of factors, the plurality of quantitative scores indicating the user's operation of the subject vehicle is better than standard operation of like vehicles and the user's vehicle is likely to require reduced or delayed maintenance and (ii) will put reduced burden on charging infrastructure compared to the like vehicles over a future period of time;

automatically adjust the periodic maintenance cost to have an adjusted value less than the initial value by an amount proportional to the reduced burden on the charging infrastructure, based upon the plurality of quantitative scores output from the vehicle maintenance and charging model; and transmit an itemized report to the user associated with the subject vehicle, the itemized report including a representation of whether the operation of the subject vehicle is better or worse than standard operation of the like vehicles, an identification of the adjusted value of the periodic maintenance cost, a representation of the decrease from the initial value of the periodic maintenance cost and the adjusted value of the periodic maintenance cost, and one or more other vehicle costs.

17. The non-transitory computer-readable storage media of claim 16, wherein the computer-executable instructions further cause the at least one processor to generate the vehicle maintenance and charging model by accessing a database including the reference telematics data associated with the like vehicles.

18. The non-transitory computer-readable storage media of claim 16, wherein to adjust the periodic maintenance cost, the computer-executable instructions further cause the at least one processor to provide the plurality of quantitative scores output from the vehicle maintenance and charging model to a pricing model that defines standard maintenance costs associated with standard operation of the like vehicles, wherein the pricing model outputs the adjusted value of the periodic maintenance cost.

19. The non-transitory computer-readable storage media of claim 16, wherein the computer-executable instructions further cause the at least one processor to:

receive second vehicle telematics data, captured using vehicle sensors disposed on the subject vehicle over the period of time, from the subject vehicle; and re-execute the vehicle maintenance and charging model using the first and second vehicle telematics data as input to receive an updated output therefrom.

20. The non-transitory computer-readable storage media of claim 16, wherein first telematics data is captured at the device sensors disposed in the user computing device over the period of time, the user computing device communicatively coupled to the subject vehicle during operation of the subject vehicle by the user.

* * * * *